Patented Feb. 4, 1941

2,230,549

UNITED STATES PATENT OFFICE 2,230,549

TREATMENT OF CASTOR OIL

Ben E. Sorenson, Upper Darby, Pa., assignor to E. I. du Pont de Nemours & Company, Wilmington, Del., a corporation of Delaware No Drawing. Application September 20, 1938, Serial No. 230,797

7 Claims. (Cl. 260—398)

This invention relates to the treatment of hydroxylated vegetable oils and more particularly to the treatment of castor oil to impart drying and other desirable properties thereto.

It has been shown elsewhere that the destructive distillation of castor oil or castor oil acids (principally ricinoleic acid) either at atmospheric or reduced pressure under regulated conditions of time and temperature, yields products which possess drying properties similar to the well known drying oils. Such products have been suggested for use as drying oil substitutes either alone or in admixture therewith and also in conjunction with the preparation of certain types of oil modified synthetic resins. The products are usually dark in color so that their use is limited. Further the yield is low which results in a consequent relatively high price and also they do not possess the most desirable properties for many uses. The simple heating of castor oil or the acids, obtained therefrom by hydrolysis, at relatively high temperatures produces products of a fairly light color but again the yield is low from 20 to 30% of the oil being lost as volatile cracked products. It has further been proposed to heat castor oil (or a mixture of castor oil and mineral oil, the latter predominating) with a few per cent of an acid compound of the non-oxidizing mineral acids containing oxygen but in the absence of substantial quantities of oxidizing agents. The "acid compounds" exclude "salts which with water show an acid reaction" but does include "such acid salts in which the quantity of acid present is higher than the quantity equivalent to that of the base of said salts." The oil with the acid compound is heated at between 150° C. and 350° C. either under vacuum or by passing an inert gas as nitrogen or carbon dioxide through the oil. Such a procedure produces a dehydrated oil which is miscible with mineral oils and may be used for other purposes. The products obtained, however, are not of a sufficiently light color to be satisfactory for many uses where light color or substantial absence of color is necessary.

This invention has as an object the provision of a method for the treatment of certain oils, e. g., castor oil to impart drying properties thereto.

A further object is the provision of a method for the treatment of castor oil in which water is removed from the oil molecule.

Another object is the provision of a method for dehydrating castor oil to produce a light colored product having a low acid number.

A still further object is the provision of a means for dehydrating castor oil with consequent high yields of the dehydrated product at relatively low cost of production.

Still another object is the preparation of a dehydrated castor oil substantially free from any products that might result from the destructive distillation of the oil.

Other objects will be apparent as the description of the invention proceeds.

These objects are accomplished by heating castor oil or the acids obtained therefrom in a volatile hydrocarbon solution in the presence of a suitable catalyst and distilling therefrom the liberated water. Where the castor oil acids are used they may be reesterified with polyhydric alcohol after the treatment to form the polyglyceride of the dehydrated oil.

The invention may be more fully described by the following examples which are intended to be illustrative but not limitative, the parts being by weight.

Example I

| | Parts |
|---|---|
| Raw castor oil | 1800 |
| High solvency petroleum naphtha | 250 |
| Anhydrous magnesium sulphate | 90 |
| 25% solution phosphorus pentoxide in isobutanol | 18 |

The above materials were charged into a suitable sized three necked flask equipped with a short column, a condenser which discharged into a suitable separator from which the water could be removed and the hydrocarbon solvent returned to the flask, a thermometer which extended below the surface of the liquid and an efficient stirrer. The flask with its contents was heated and distillation started at approximately 185° C. The distillation was continued until the temperature reached approximately 220° C. and the removal of water had practically ceased. The total time of the distillation was 12 hours. The theoretical water that could be removed, based on the acetyl value of the castor oil was 85 parts. The dehydration based on the water removed was therefore 82.3%.

The liquid was cooled and then filtered to remove the catalyst and other extraneous material.

After filtration the hydrocarbon solvent was removed by distillation under reduced pressure. The final oil obtained possessed the following properties:

Viscosity K (Gardner-Holdt scale)
Color 1.0 (Gardner-Holdt scale)
Acid number 1.2

Example II

| | Parts |
|---|---|
| Raw castor oil | 1800 |
| High solvency petroleum naphtha | 150 |
| Anhyrous magnesium sulphate | 90 |
| 25% solution of phosphorus pentoxide in isobutanol | 18 |

This example differs from Example I in the use of a smaller quantity of hydrocarbon solvent.

The above materials were treated according to the procedure described under Example I. The distillation started at 197° C. and was carried to 240° C. The total time of the distillation was 5 hours and the water split out amounted to 74 parts. The theoretical amount of water which could be removed from the oil based on the acetyl value was 85 parts. The dehydration based on the amount of water removed was therefore 87%.

The oil obtained after removing solid material from the solution by filtration and removing the solvent by distillation under vacuum possessed the following constants:

Viscosity K (Gardner-Holdt scale)
Color 1.0 (Gardner-Holdt scale)
Acid number 2.6

Example III

| | Parts |
|---|---|
| Raw castor oil | 3600 |
| High solvency petroleum naphtha | 275 |
| Anhydrous aluminum sulphate | 75.5 |
| Dehydrated disodium phosphate | 14.5 |

This example differs from the previous examples in that a smaller amount of hydrocarbon solvent relative to the amount of castor oil was used and also in the use of a smaller quantity of catalyst. The specific catalyst is also different from that in the previous examples. The procedure used in treating the raw oil was the same as described under Example I. The temperature range of the distillation was 205–240° C. and the total time of distillation was 6½ hours. The amount of water removed was 157 parts. The theoretical amount of water to be removed based on the acetyl value of the oil was 170 parts. The dehydration therefore based on the water removed was 92.5%. After filtration of the solution and removal of the solvent by distillation under vacuum the oil possessed the following properties:

Viscosity K (Gardner-Holdt scale)
Color 2.0 (Gardner-Holdt scale)
Acid number 2.4

Example IV

| | Parts |
|---|---|
| Raw castor oil | 1800 |
| Petroleum naphtha | 150 |
| Anhydrous aluminum sulphate | 28 |
| Dehydrated disodium phosphate | 8 |

This example differs from the previous ones essentially in the use of a lower percentage of catalyst. The procedure used was that described under Example I. The temperature range was 215° C. to 240° C. and the total time of distillation was 5½ hours. The water removed amounted to 74 grams which based on the theoretical water removed for complete dehydration yielded a dehydration of 87%. After filtration of the solution and removal of the solvent by vacuum distillation the oil possessed the following properties:

Viscosity J (Gardner-Holdt scale)
Color 1.0 (Gardner-Holdt scale)
Acid number 2.5

As the solvent in place of the high solvency petroleum naphtha may be used other non-reactive solvents insoluble in water as, e. g., mineral spirits (boiling range 150–215° C.); Hi-flash naphtha (boiling range 150–205° C.); heavy petroleum naphtha (boiling range 185–215° C.), etc. Lower boiling range materials may also be used. The use of the inert hydrocarbon solvent allows the dehydration to take place at a lower temperature, eliminating the possibility of over-heating the oil and thus producing cracked products and aids in the removal of the water. Varying amounts of the non-reactive solvent for the oil may be used, a working range which yields satisfactory results being such in which one part of solvent to from 5 to 20 parts of oil are used. For certain uses of the oil it may not be necessary to remove the solvent by distillation after the dehydration. The amount of solvent used and other conditions surrounding its use will be determined largely by the purpose for which the dehydrated oil is to be used and will be readily apparent to those skilled in the art.

The catalyst used in the present process may be described as one composed of a neutral salt of a polyvalent metal (as magnesium or aluminum) and sulphuric acid and phosphorus pentoxide or the dibasic salt of a monovalent metal (as sodium or potassium) of the corresponding acid of the latter.

The combination of the two materials as the catalyst in the dehydration process is essential since the use alone of either the phosphorus pentoxide or the dibasic salt of its corresponding acid is not satisfactorily effective. The use of the neutral polyvalent metal salt of sulphuric acid alone is not effective. However, the use of the latter with phosphorus pentoxide or the dibasic salt of its corresponding acid produces the desired dehydration of the oil. The neutral polyvalent metal salt may therefore be designated as a catalyst promoter. For certain obvious reasons the use of the dibasic phosphate is preferred. It has been found that the ratio of the dibasic salt of phosphoric acid to the neutral polyvalent metal salt of sulphuric acid influences the rate of dehydration and the final color of the dehydrated oil. A satisfactory range for the ratio of the neutral sulphate (aluminum sulphate) to the dibasic phosphate or phosphorus pentoxide has been found to be 50:50 to 90:10. The preferred ratio has been found to be 84:16. In the case of the magnesium sulphate a satisfactory range has been found to be 99.9:0.1 to 96.0:4.0 with a preferred ratio of 98.0:2.0.

The amount of total catalyst based on the oil may conveniently vary within a range of from 1.25% to 6.00%.

Larger amounts of catalyst than indicated above may be used in which instance the time for dehydration may be materially shortened but under these conditions there is a marked tendency toward the production of darker colored oils. Lower percentages of catalyst may be used but in such instances the time of dehydration is unduly extended.

In place of castor oil the acids obtained from the hydrolysis of the oil may be dehydrated or pure ricinoleic acid may be used. The degree of dehydration may be varied where the oil is used since approximately three mols of water may be theoretically removed from one mol of oil. For certain purposes only partial dehydration may be desirable.

The dehydrated oil prepared according to the present invention possesses drying properties similar to the naturally occurring drying oils. The oil may therefore be used either wholly or in part in preparing drying oil compositions as varnishes, paint vehicles or coating compositions in general to be applied to various types of surfaces, rigid or otherwise or to be used as impregnating agents for porous pliable sheet or other form material. The dehydrated castor oil may further be used in modifying synthetic resin as, e. g., those of the alkyd and phenolic type, etc.

The process presents as a principal advantage a means for preparing dehydrated castor oil, by treating the oil in solution, at a relatively low temperature resulting in highly efficient yields. A further advantage is the production of a light colored oil substantially free of cracked products. Other advantages will be apparent to those skilled in the art.

It is apparent that many widely different embodiments of this invention may be made without departing from the spirit and scope thereof and therefore it is not intended to be limited except as indicated in the appended claims.

I claim:

1. The process of dehydrating castor oil which comprises heating a solution thereof in a liquid hydrocarbon solvent which is non-reactive and insoluble in water in the presence of a neutral sulphate of a polyvalent metal and a compound containing phosphorus pentoxide.

2. The process of dehydrating castor oil which comprises heating a solution thereof in a liquid hydrocarbon which is non-reactive and is insoluble in water in the presence of a mixture of magnesium sulphate and phosphorus pentoxide and removing water as it is liberated from the oil.

3. The process of dehydrating castor oil which comprises heating a solution thereof in a liquid hydrocarbon which is non-reactive and is insoluble in water in the presence of a secondary phosphate and a neutral sulphate of a polyvalent metal.

4. The process of claim 3 in which the sulphate is magnesium sulphate.

5. The process of dehydrating castor oil which comprises heating a solution thereof in a volatile liquid hydrocarbon which is non-reactive and is insoluble in water in the presence of a neutral sulphate and a compound containing phosphorus pentoxide, the ratio of the sulphate to phosphorus pentoxide being between 1:1 and 9:1.

6. The process which comprises dehydrating raw castor oil by heating the oil, petroleum naphtha, and a small amount of magnesium sulphate and phosphorus pentoxide to about 220° C. for about twelve hours and removing the separated water therefrom.

7. The process of dehydrating materials selected from the class consisting of castor oil and its acids which comprises dissolving the same in a non-reactive, water-insoluble solvent, adding a catalyst comprising a neutral sulphate of a polyvalent metal, and a material selected from the class consisting of phosphorus pentoxide and the dibasic salts of a monovalent metal and phosphoric acid, the catalyst being present in amount from about 1.25% to 6% of the oil, heating the mixture, and removing water as it is formed.

BEN E. SORENSON.